(12) United States Patent
George

(10) Patent No.: US 11,494,227 B2
(45) Date of Patent: Nov. 8, 2022

(54) SYSTEM AND METHOD FOR CREATING PROCESS AUTOMATION WORKFLOW OF A PROCESS AUTOMATION TASK IN A ROBOTIC PROCESS AUTOMATION ENVIRONMENT

(71) Applicant: Anto George, Bangalore (IN)

(72) Inventor: Anto George, Bangalore (IN)

(73) Assignee: Anto George

( * ) Notice: Subject to any disclaimer, the term of this patent is extended or adjusted under 35 U.S.C. 154(b) by 358 days.

(21) Appl. No.: 16/613,375

(22) PCT Filed: Oct. 29, 2019

(86) PCT No.: PCT/IB2019/059253
§ 371 (c)(1),
(2) Date: Nov. 13, 2019

(87) PCT Pub. No.: WO2021/048604
PCT Pub. Date: Mar. 18, 2021

(65) Prior Publication Data
US 2021/0342183 A1    Nov. 4, 2021

(30) Foreign Application Priority Data
Sep. 12, 2019  (IN) .............................. 201941036778

(51) Int. Cl.
*G06F 9/48* (2006.01)
*G06F 9/30* (2018.01)

(52) U.S. Cl.
CPC .......... *G06F 9/4881* (2013.01); *G06F 9/3005* (2013.01)

(58) Field of Classification Search
None
See application file for complete search history.

(56) References Cited

U.S. PATENT DOCUMENTS

| | | | |
|---|---|---|---|
| 7,403,948 B2* | 7/2008 | Ghoneimy | G06Q 99/00 707/792 |
| 7,506,302 B2* | 3/2009 | Bahrami | G06Q 10/10 717/100 |
| 9,317,822 B2* | 4/2016 | Bohm | G06Q 10/06 |
| 10,339,027 B2* | 7/2019 | Garcia | G06F 11/3409 |
| 2003/0177046 A1* | 9/2003 | Socha-Leialoha | G06Q 10/103 717/101 |

(Continued)

FOREIGN PATENT DOCUMENTS

| | | |
|---|---|---|
| EP | 3206170 A1 | 8/2017 |
| WO | 2017001560 A1 | 1/2017 |

*Primary Examiner* — Van H Nguyen
(74) *Attorney, Agent, or Firm* — Jason C. Cameron

(57) ABSTRACT

A system and a method for creating workflow of a task is disclosed. The system includes a data fetching subsystem configured to fetch data from at least one first tool based on a requirement to perform a task, a communication subsystem configured to enable communication between the at least one first tool and at least one second tool using a transformation engine for facilitating data exchange between the at least one tool and the at least one second tool, a workflow generation subsystem configured to obtain workflow based on a predefined condition by exchanging the data between the at least one tool and the at least one second tool, wherein the predefined condition depends upon the requirement of the task.

6 Claims, 5 Drawing Sheets

(56) References Cited

U.S. PATENT DOCUMENTS

2012/0303586 A1* 11/2012 Drath .................... G06F 16/25
707/649
2017/0052824 A1 2/2017 Sharma et al.
2018/0197123 A1* 7/2018 Parimelazhagan ........................
G06Q 10/0633

* cited by examiner

SYSTEM AND METHOD FOR CREATING PROCESS AUTOMATION WORKFLOW OF A PROCESS AUTOMATION TASK IN A ROBOTIC PROCESS AUTOMATION ENVIRONMENT

This International Application claims priority from a complete patent application filed in India having Patent Application No. 201941036778, filed on Sep. 12, 2019 and PCT Application filed with the World International Property Organisation (WIPO) having Patent Application No. PCT/IB2019/059253, filed on Oct. 29, 2019 titled "SYSTEM AND METHOD FOR CREATING WORKFLOW OF A TASK".

FIELD OF INVENTION

Embodiments of a present disclosure relate to data processing system, and more particularly to a system and method for creating workflow of a task.

BACKGROUND

In an organization, users work on a plurality of application programs to accomplish a plurality of tasks. However, some of these tasks are repetitive and monotonous in nature and requires a lot of effort and time. Also, there is a possibility for error occurrence while performing repetitive tasks. To overcome the aforementioned problems, some kind of process automation tools such as Robotic Process Automation has been introduced which requires some amount of learning to perform some tasks. Robotic process automation allows organizations to automate task just like a human being was doing them across application and systems.

However, the automation tool requires trained developers to perform coding using different languages for automating the process or the task. Such solution restricts the usability of the RPA Tool to those organizations or individuals who can afford to employ such skilled employees. Also, such solution also requires a lot of efforts to train an individual which in a time-consuming process.

Hence, there is a need for an improved system and method for creating workflow of a task in order to address the aforementioned issues.

BRIEF DESCRIPTION

In accordance with an embodiment of the disclosure, a system for creating workflow of a task is disclosed. The system includes a data fetching subsystem operable by one or more processors. The data fetching subsystem is configured to fetch data from at least one first tool based on a requirement to perform a task. The system also includes a communication subsystem operable by the one or more processors. The communication subsystem is operatively coupled to the data fetching subsystem. The communication subsystem is configured to enable communication between the at least one first tool and at least one second tool using a transformation engine for facilitating data exchange between the at least one tool and the at least one second tool, wherein the communication depends upon the task to be performed. The system also includes workflow generation subsystem operable by the one or more processors. The workflow generation subsystem is operatively coupled to the communication subsystem. The workflow generation subsystem is configured to obtain workflow based on a predefined condition by exchanging the data between the at least one first tool and the at least one second tool, wherein the predefined condition depends upon the requirement of the task.

In accordance with another embodiment, a system for creating workflow of a task is provided. The system includes a framework. The framework includes a data fetching subsystem operable by one or more processors. The data fetching subsystem is configured to fetch data from at least one first tool based on a requirement to perform a task. The framework also includes a communication subsystem operable by the one or more processors. The communication subsystem is operatively coupled to the data fetching subsystem. The communication subsystem is configured to enable communication between the at least one first tool and at least one second tool using a transformation engine for facilitating data exchange between the at least one tool and the at least one second tool, wherein the communication depends upon the task to be performed. The framework also includes a workflow generation subsystem operable by the one or more processors. The workflow generation subsystem is operatively coupled to the communication subsystem. The workflow generation subsystem is configured to obtain workflow based on a predefined condition by exchanging the data between the at least one first tool and the at least one second tool, wherein the predefined condition depends upon the requirement of the task. The framework also includes a processing subsystem operable by the one or more processors. The processing subsystem is operatively coupled to the workflow generation subsystem. The processing subsystem is configured to invoke a processing tool within the framework to enable obtained workflow of the required task.

In accordance with yet another embodiment, a method for creating workflow of a task is provided. The method includes fetching data from at least one first tool based on a requirement to perform a task. The method also includes enabling communication between the at least one first tool and at least one second tool using a transformation engine for facilitating data exchange between the at least one tool and the at least one second tool, wherein the communication depends upon the task to be performed. The method also includes obtaining workflow based on a predefined condition by exchanging the data between the at least one first tool and the at least one second tool, wherein the predefined condition depends upon the requirement of the task.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
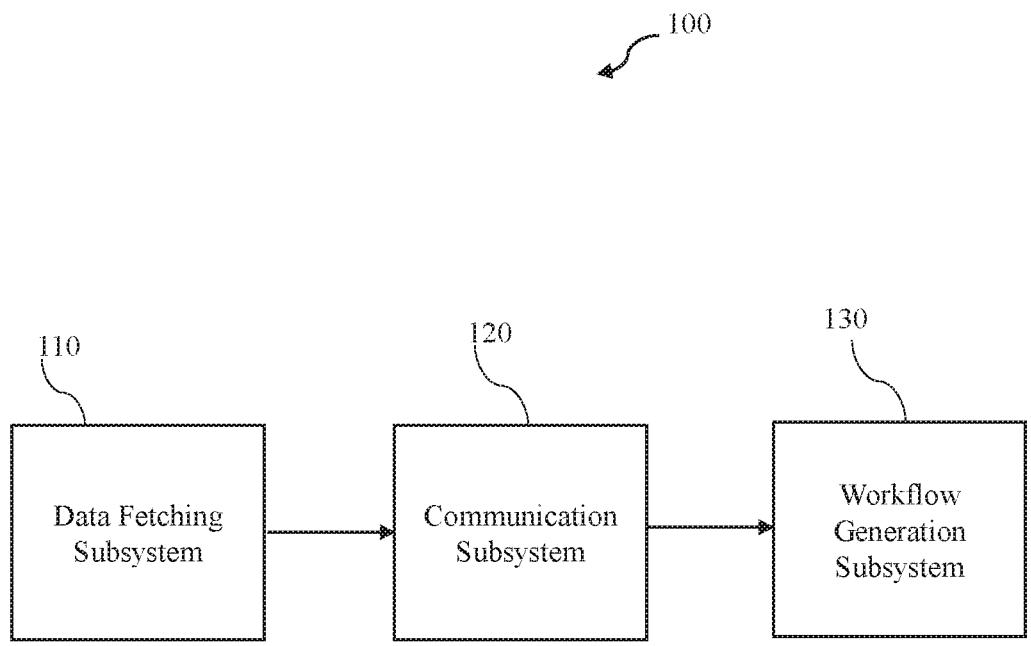
FIG. 1 is a block diagram representation of a system for creating workflow of a task in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for creating workflow of a task is disclosed. The system includes a data fetching subsystem operable by one or more processors. The data fetching subsystem is configured to fetch data from at least one first tool based on a requirement to perform a task. The system also includes a communication subsystem operable by the one or more processors. The communication subsystem is operatively coupled to the data fetching subsystem. The communication subsystem is configured to enable communication between the at least one first tool and at least one second tool using a transformation engine for facilitating data exchange between the at least one tool and the at least one second tool, wherein the communication depends upon the task to be performed. The system also includes workflow generation subsystem operable by the one or more processors. The workflow generation subsystem is operatively coupled to the communication subsystem. The workflow generation subsystem is configured to obtain workflow based on a predefined condition by exchanging the data between the at least one first tool and the at least one second tool, wherein the predefined condition depends upon the requirement of the task.

FIG. 1 is a block diagram representation of a system 100 for creating workflow of a task in accordance with an embodiment of the present disclosure. The system 100 includes a data fetching subsystem 110 operable by one or more processors. The data fetching subsystem 110 is configured to fetch data from at least one first tool based on a requirement to perform a task. In one embodiment, the at least one first tool may include at least one first internal tool.

In one embodiment, at least one first internal tool may be housed within a framework. In such embodiment, the framework may include a unified data exchange framework (UDEF). In some embodiment, a plurality of external tools may be fetched into a workflow area using at least one first internal tool. In some embodiment, the at least one first internal tool may include a processing tool. In such embodiment, the processing tool may include a robotic process automation (RPA) tool. In one embodiment, the plurality of tools may be associated with a plurality of information technology domains.

The system 100 also includes a communication subsystem 120 operable by the one or more processors. The communication subsystem 120 is operatively coupled to the data fetching subsystem 110. The communication subsystem 120 is configured to enable communication between the at least one first tool and at least one second tool using a transformation engine for facilitating data exchange between the at least one first tool and the at least one second tool, wherein the communication depends upon the task to be performed. In one embodiment, the transformation engine may include a unified data format (UDF).

In some embodiment, the communication between the at least one first tool and the at least one second tool may include transformation of the fetched data from the at least one first tool into a unified data format by the transformation engine for facilitating the data exchange between the at least one first tool and the at least one second tool.

In some embodiment, the communication subsystem 120 may be configured to enable the at least one second tool to consume an output of the at least one first tool within the framework using the transformation engine. In one embodiment, the transformation engine may also act as a gateway between a plurality of tools and/within the framework.

The system 100 also includes workflow generation subsystem 130 operable by the one or more processors. The workflow generation subsystem 130 is operatively coupled to the communication subsystem 120. The workflow generation subsystem 130 is configured to obtain workflow based on a predefined condition by exchanging the data between the at least one first tool and the at least one second tool, wherein the predefined condition depends upon the requirement of the task.

In one embodiment, the workflow generation subsystem 130 may be configured to obtain the workflow of the required task in a sequential manner. In another embodiment, the workflow generation subsystem 130 may be configured to obtain the workflow in a rule-based manner based on the required task.

In one embodiment, the system 100 may include a processing subsystem configured to invoke the processing tool within the framework to enable obtained workflow of the required task. In some embodiment, the processing subsystem may be configured to invoke the processing tool within the framework to achieve a streamlined automation process of the required task.

In one embodiment, the data fetching subsystem 110, the communication subsystem 120, the workflow generation subsystem 130 and the processing subsystem are housed within the framework.

Figure 2:
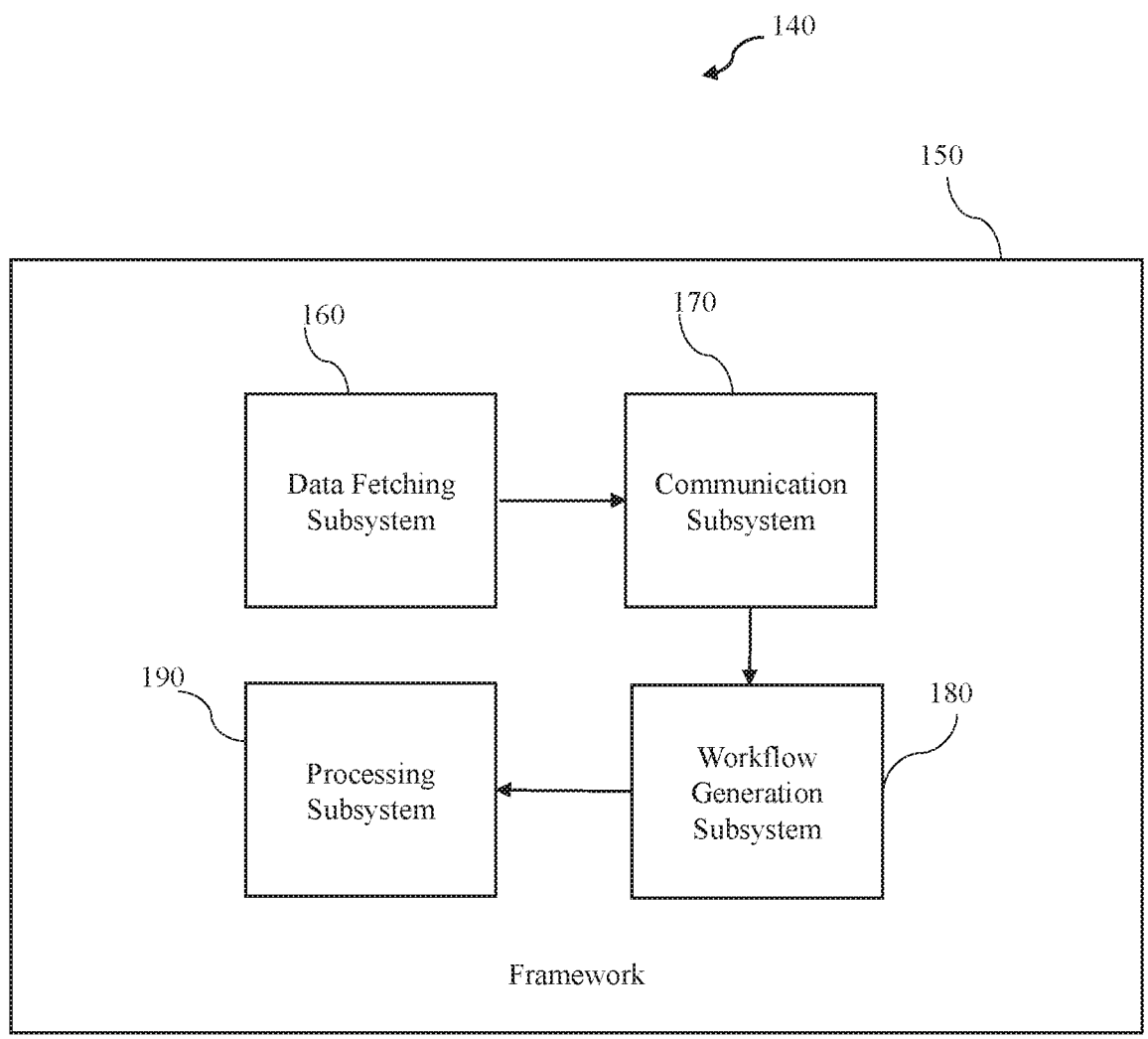
FIG. 2 is a block diagram representation of a system for creating workflow of a task in accordance with another embodiment of the present disclosure.

FIG. 2 is a block diagram representation of a system 140 for creating workflow of a task in accordance with another embodiment of the present disclosure. The system 140 includes a framework 150. In one embodiment, the framework 150 may include a unified data exchange framework. The framework 150 includes a data fetching subsystem 160 operable by one or more processors. The data fetching subsystem 160 is configured to fetch data from at least one first tool based on a requirement to perform a task.

In one embodiment, the at least one first tool may include at least one first internal tool. In some embodiment, a plurality of external tools may be fetched into a workflow area using the at least one first internal tool. In some embodiment, the at least one first internal tool may include a processing tool. In such embodiment, the processing tool may include a robotic process automation (RPA) tool. In one embodiment, the plurality of tools may be associated with a plurality of information technology domains.

The framework 150 also includes a communication subsystem 170 operable by the one or more processors. The communication subsystem 170 is operatively coupled to the data fetching subsystem 160. The communication subsystem 170 is configured to enable communication between the at least one first tool and at least one second tool using a transformation engine for facilitating data exchange between the at least one tool and the at least one second tool, wherein the communication depends upon the task to be performed. In one embodiment, the transformation engine may include a unified data format (UDF).

In some embodiment, the communication between the at least one first tool and the at least one second tool may include transformation of the fetched data from the at least one first tool into a unified data format by the transformation engine for facilitating the data exchange between the at least one first tool and the at least one second tool.

In some embodiment, the communication subsystem 170 may be configured to enable the at least one second tool to consume an output of the at least one first tool within the framework using the transformation engine. In one embodiment, the transformation engine may also act as a gateway between a plurality of tools and/within the framework.

The framework 150 also includes a workflow generation subsystem 180 operable by the one or more processors. The workflow generation subsystem 180 is operatively coupled to the communication subsystem 170. The workflow generation subsystem 180 is configured to obtain workflow based on a predefined condition by exchanging the data between the at least one tool and the at least one second tool, wherein the predefined condition depends upon the requirement of the task.

In one embodiment, the workflow generation subsystem 180 may be configured to obtain the workflow of the required task in a sequential manner. In another embodiment, the workflow generation subsystem 180 may be configured to obtain the workflow in a rule-based manner based on the required task.

The framework 140 also includes a processing subsystem 190 operable by the one or more processors. The processing subsystem 190 is operatively coupled to the workflow generation subsystem 180. The processing subsystem 190 is configured to invoke the processing tool within the framework to enable obtained workflow of the required task. In some embodiment, the processing subsystem 190 may be configured to invoke the processing tool within the framework to achieve a streamlined automation process of the required task.

Figure 3:
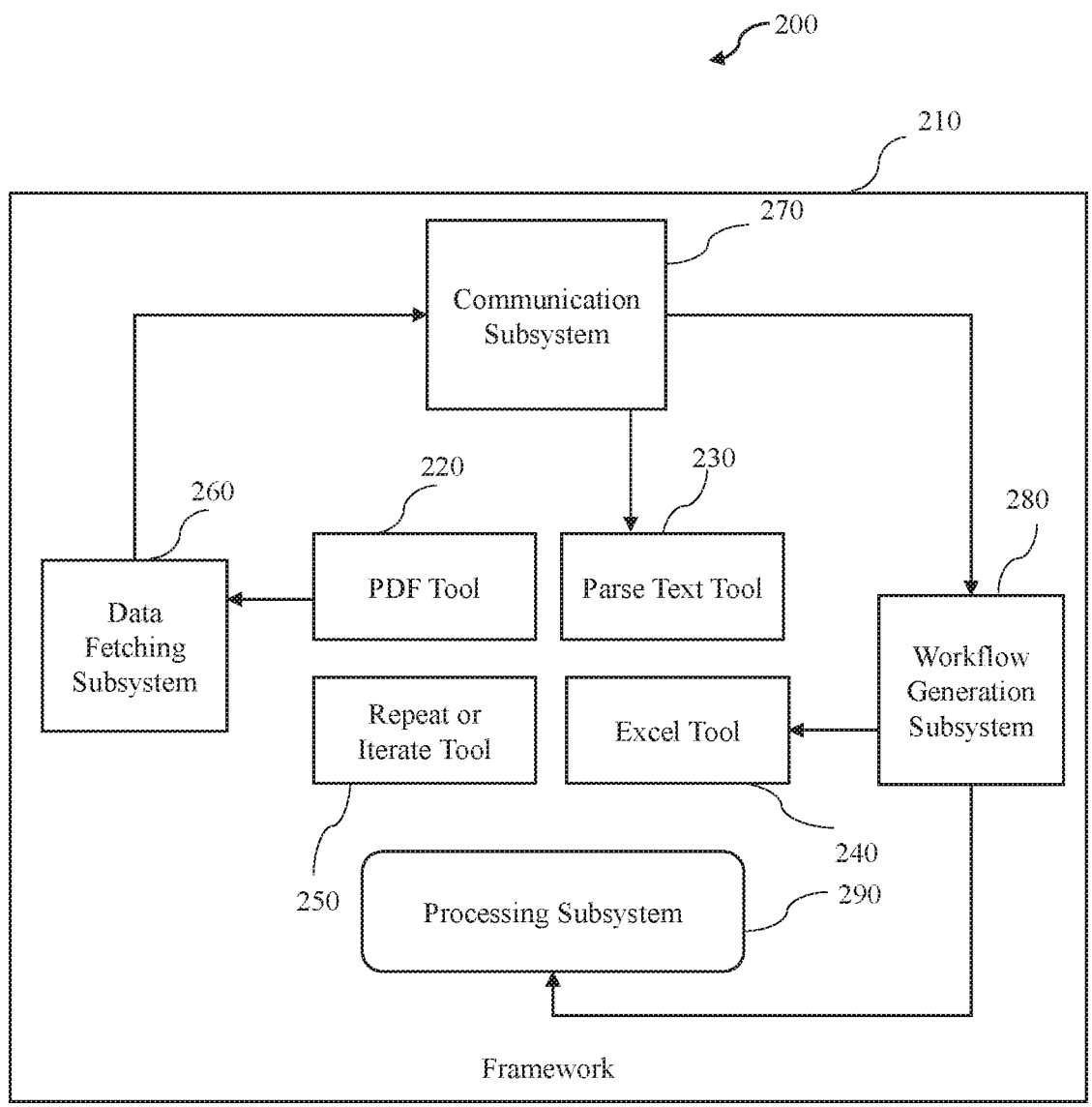
FIG. 3 is a block diagram representation of an embodiment of the system for creating workflow of a task of FIG. 1 in accordance with an embodiment of the present disclosure.

FIG. 3 is a block diagram of an embodiment of the system 200 for creating workflow of a task of FIG. 1 in accordance with an embodiment of the present disclosure. As an example, the workflow for formatting data from one format to another format is generated by using a plurality of internal and external tools. Initially, a portable document format (PDF) tool 220 from the plurality of internal tools is dragged to a workflow area within a framework 210. Further, the data is fetched, by a data fetching subsystem 260, from a PDF file using the PDF tool 220 and receive an output from the PDF tool 220 as a text output.

Furthermore, the text output received the PDF tool 220 is processed by a parse text tool 230 to format the data in a tabular form by a communication subsystem 270, by using a data exchange format. Upon formatting the fetched data into a tabular form, the tabular data is fetched into an excel file using an excel tool 240. Further, the iteration tool 250 is dragged into a workflow area to iterate or repeat the above process again for the same requirement. The workflow is obtained, by the workflow generation subsystem 280, for formatting data from one data format to second data format. Afterwards, the RPA tool is invoked, by the processing subsystem 290, within the framework 210 to seamlessly automate the obtained workflow.

Furthermore, the data fetching subsystem 260, the communication subsystem 270 and the workflow generation subsystem 280 are substantially similar to a data fetching subsystem 110, a communication subsystem 120 and a workflow generation subsystem 130 of FIG. 1.

Figure 4:
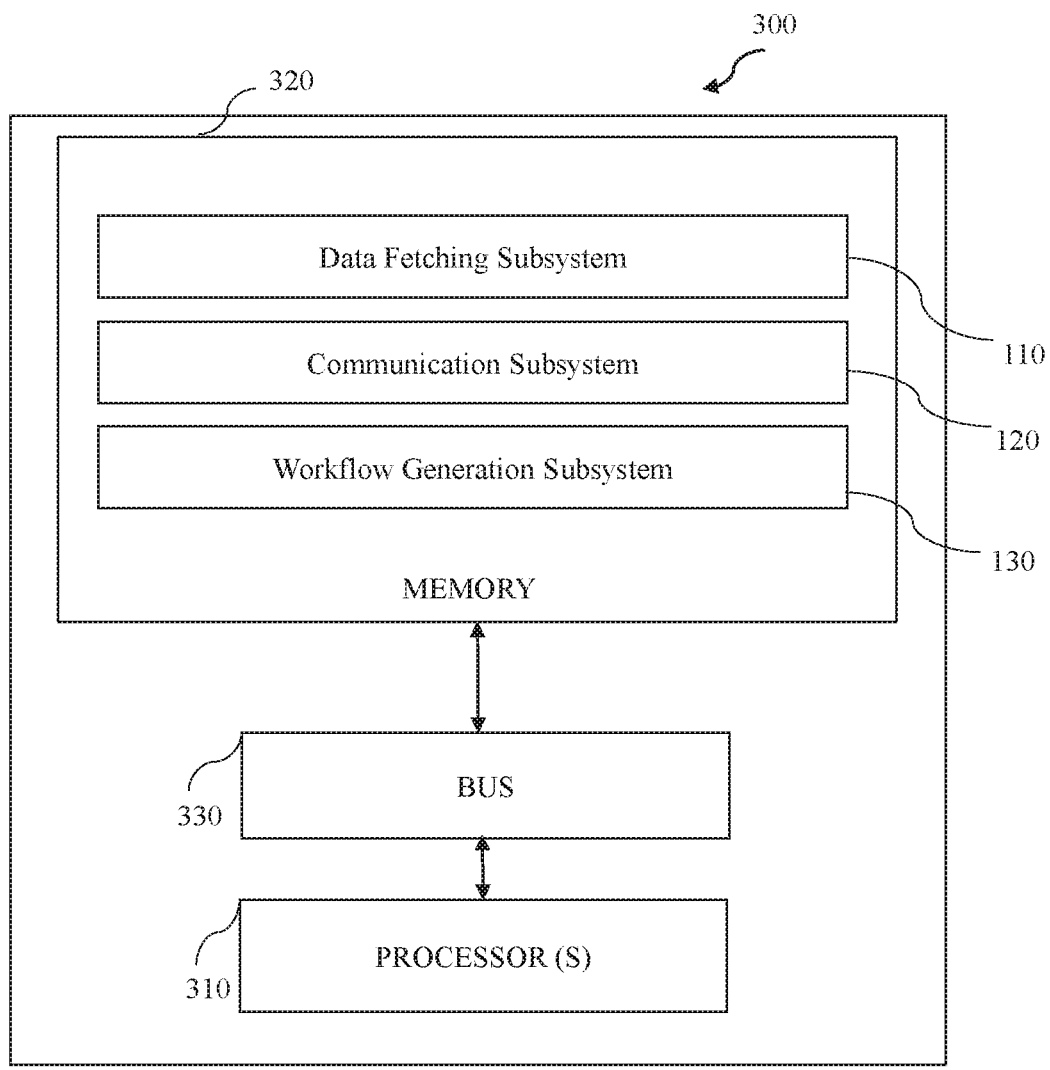
FIG. 4 is a block diagram representation of a general computer system in accordance with an embodiment of the present disclosure.

FIG. 4 is a block diagram of a general computer system 300 in accordance with an embodiment of the present disclosure. The computer system 300 includes processors 310, and memory 320 coupled to the processors 310 via a bus 330.

The processor(s) 310, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 320 includes a plurality of subsystems stored in the form of executable program which instructs the processor 310 to perform the configuration of the system illustrated in FIG. 1. The memory 320 has following subsystems: a data fetching subsystem 110, a communication subsystem 120 and a workflow generation subsystem 130 of FIG. 1.

Computer memory elements may include any suitable memory devices for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program subsystems, including functions, procedures, data structures, and application programs, for performing tasks, or defining abstract data types or low-level hardware contexts. Executable program stored on any of the above-mentioned storage media may be executable by the processor(s) 310.

The data fetching subsystem 110 instructs the processor(s) 310 to fetch data from at least one first tool based on a requirement to perform a task.

The communication subsystem 120 instructs the processor(s) 310 to enable communication between the at least one first tool and at least one second tool using a transformation engine for facilitating data exchange between the at least one tool and the at least one second tool, wherein the communication depends upon the task to be performed.

The workflow generation subsystem 130 instructs the processor(s) 310 to obtain workflow based on a predefined condition by exchanging the data between the at least one tool and the at least one second tool, wherein the predefined condition depends upon the requirement of the task.

Figure 5:
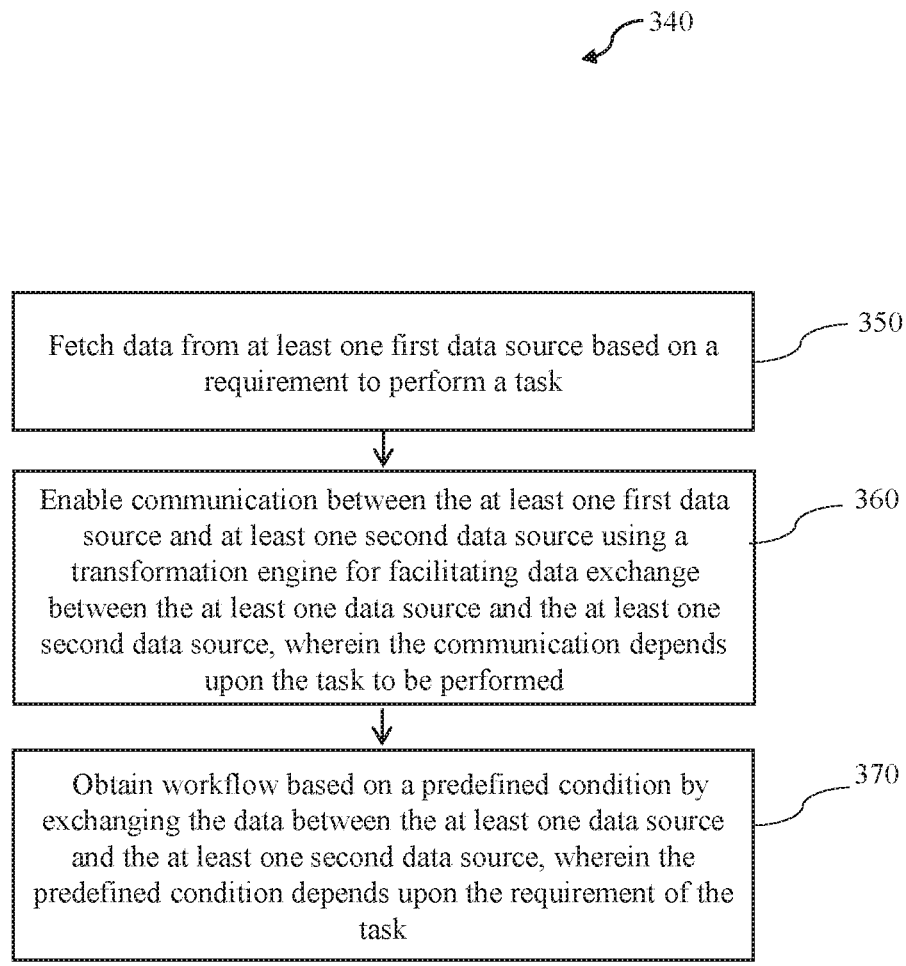
FIG. 5 is a flow diagram representing steps involved in a method for creating workflow of a task in accordance with an embodiment of the present disclosure.

FIG. 5 is a flow diagram representing steps involved in a method 340 for creating workflow of a task in accordance with an embodiment of the present disclosure. The method 340 includes fetching, by a data fetching subsystem, data from at least one first tool based on a requirement to perform a task in step 350. In one embodiment, fetching the data from the at least one first tool may include fetching the data from the at least one first internal tool.

In one embodiment, the at least one first external tool may be fetched by using the at least one internal tool using an external application interface.

The method 340 also includes enabling, by a communication subsystem, communication between the at least one first tool and at least one second tool using a transformation engine for facilitating data exchange between the at least one tool and the at least one second tool, wherein the communication depends upon the task to be performed in step 360. In one embodiment, enabling the communication between the at least one first tool and the at least one second tool using the transformation engine may include enabling the communication between the at least one first tool and the at least one second tool using a unified data format (UDF).

In some embodiment, enabling communication between the at least one first tool and at least one second data may include performing transformation of the fetched data from the at least one first tool into a unified data format by the transformation engine for facilitating the data exchange between the at least one first tool and the at least one second tool.

In one embodiment, the method 340 may include enabling, by the communication subsystem, the at least one second tool to consume an output of the at least one first tool within the framework using the transformation engine.

The method 340 also includes obtaining, by a workflow generation subsystem, workflow based on a predefined condition by exchanging the data between the at least one tool and the at least one second tool, wherein the predefined condition depends upon the requirement of the task in step 370. In one embodiment, obtaining the workflow based on the predefined condition may include obtaining the workflow of the required task in a sequential manner. In another embodiment, obtaining the workflow based on the predefined condition may include obtaining the workflow in a rule-based manner based on the required task.

In one specific embodiment, the method 340 may include invoking, by a processing subsystem, a processing tool within the framework to enable obtained workflow of the required task. In such embodiment, invoking the processing tool within the framework may include invoking the robotic process automation (RPA) tool. In some embodiment, invoking the processing tool within the framework may include invoking the processing tool within the framework to achieve a streamlined automation process of the required task.

Various embodiments of the system provide a unified data exchange framework which facilitates a dynamic interconnection between a plurality of internal specialized tools and a plurality of external tools with a Robotic Process Automation RPA tool to seamlessly integrate the automation processes. Also, the framework provides a scripting functionality to incorporate enhancements done by programmers. Such solution increases an efficiency and productivity of a business while reducing the overall costs. Moreover, such framework requires simple configuration setting to customize any task design. Further, the framework reduces the product familiarization training duration for any personnel and eliminates the need of any coding.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for creating process automation workflow of a robotic process automation task comprising:
    a data fetching subsystem executed by one or more processors, and configured to fetch data from at least one first robotic process automation tool based on a requirement to perform a robotic process automation task;
    a communication subsystem executed by the one or more processors, wherein the communication subsystem is communicatively coupled to the data fetching subsystem, and configured to enable communication between the at least one first robotic process automation tool and at least one second robotic process automation tool using a transformation engine for facilitating data exchange between the at least one first robotic process automation tool and the at least one second robotic process automation tool, wherein the communication depends upon the robotic process automation task to be performed, wherein the at least one first robotic process automation tool and the at least one second robotic process automation tool are associated with a plurality of information technology domains; and a workflow generation subsystem executed by the one or more processors, wherein the workflow generation subsystem is communicatively coupled to the communication subsystem, and configured to obtain process automation workflow based on a predefined condition by exchanging the data between the at least one robotic process automation tool and the at least one second robotic process automation tool, wherein the predefined condition depends upon the requirement of the robotic process automation task;

a processing subsystem executed by the one or more processors, wherein the processing subsystem is communicatively coupled to the workflow generation subsystem, and configured to invoke a processing tool within a framework to automate the obtained process automation workflow of the robotic process automation task, and wherein the data fetching subsystem, the communication subsystem and the workflow generation subsystem are housed within the framework, and wherein the processing subsystem is configured to invoke the processing tool within the framework to automate the obtained process automation workflow of the required robotic process automation task.

2. The system as claimed in claim 1, wherein the transformation engine comprises a unified data format.

3. A system for creating a process automation workflow of a robotic process automation task comprising:
   a framework, wherein the framework comprising;
      a data fetching subsystem executed by one or more processors, and configured to fetch data from at least one first robotic process automation tool based on a requirement to perform a robotic process automation task;
      a communication subsystem executed by the one or more processors, wherein the communication subsystem is communicatively coupled to the data fetching subsystem, and configured to enable communication between the at least one first robotic process automation tool and at least one second robotic process automation tool using a transformation engine for facilitating data exchange between the at least one robotic process automation tool and the at least one second robotic process automation tool, wherein the communication depends upon the robotic process automation task to be performed;
      a workflow generation subsystem executed by the one or more processors, wherein the workflow generation subsystem is communicatively coupled to the communication subsystem, and configured to obtain workflow based on a predefined condition by exchanging the data between the at least one robotic process automation tool and the at least one second robotic process automation tool, wherein the predefined condition depends upon the requirement of the robotic process automation task; and
      a processing subsystem executed by the one or more processors, wherein the processing subsystem is communicatively coupled to the workflow generation subsystem, and configured to invoke a processing tool within the framework to automate the obtained process automation workflow of the required robotic process automation task, and wherein the data fetching subsystem, the communication subsystem and the workflow generation subsystem are housed within the framework, and wherein the processing subsystem is configured to invoke the processing tool within the framework to automate the obtained process automation workflow of the required robotic process automation task.

4. The system as claimed in claim 3, wherein the transformation engine comprises a unified data format.

5. A method for creating process automation workflow of a robotic process automation task comprising:
   fetching, by a data fetching subsystem, data from at least one first robotic process automation tool based on a requirement to perform a robotic process automation task;
   enabling, by a communication subsystem, communication between the at least one first robotic process automation tool and at least one second robotic process automation tool using a transformation engine for facilitating data exchange between the at least one robotic process automation tool and the at least one second robotic process automation tool, wherein the communication depends upon the robotic process automation task to be performed;
   obtaining, by a workflow generation subsystem, process automation workflow based on a predefined condition by exchanging the data between the at least one robotic process automation tool and the at least one second robotic process automation tool, wherein the predefined condition depends upon the requirement of the robotic process automation task, and
   invoking, by a processing subsystem, a processing tool within a framework to automate the obtained process automation workflow of the robotic process automation task, wherein the data fetching subsystem, the communication subsystem and the workflow generation subsystem are housed within the framework, and wherein the processing subsystem is configured to invoke the processing tool within the framework to automate the obtained process automation workflow of the required robotic process automation task.

6. The method as claimed in claim 5, wherein communicating between the at least one first robotic process automation tool and at least one second robotic process automation tool using a transformation engine comprises communicating between the at least one first robotic process automation tool and at least one second robotic process automation tool using a unified data format.

* * * * *